US008065581B2

(12) United States Patent
Lundby

(10) Patent No.: US 8,065,581 B2
(45) Date of Patent: *Nov. 22, 2011

(54) FEEDBACK FOR DATA TRANSMISSIONS

(75) Inventor: Stein A. Lundby, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/692,431

(22) Filed: Jan. 22, 2010

(65) Prior Publication Data

US 2010/0195502 A1 Aug. 5, 2010

Related U.S. Application Data

(63) Continuation of application No. 11/562,332, filed on Nov. 21, 2006, now Pat. No. 7,676,724, which is a continuation of application No. 10/191,730, filed on Jul. 8, 2002, now Pat. No. 7,159,163.

(51) Int. Cl.
 *H04M 1/14* (2006.01)
(52) U.S. Cl. ........................ 714/750; 370/394
(58) Field of Classification Search .................. 370/394; 714/750
 See application file for complete search history.

(56) References Cited

U.S. PATENT DOCUMENTS

| | | | |
|---|---|---|---|
| 4,103,459 A | 8/1978 | Barnerias et al. | |
| 4,500,987 A | 2/1985 | Hasegawa | |
| 4,901,307 A | 2/1990 | Gilhousen et al. | |
| 5,103,459 A | 4/1992 | Gilhousen et al. | |
| 5,291,481 A | 3/1994 | Doshi et al. | |
| 6,078,591 A | 6/2000 | Kalkunte et al. | |
| 6,567,388 B1 | 5/2003 | Tomcik et al. | |
| 6,693,910 B2 | 2/2004 | Chao | |
| 7,069,490 B2 | 6/2006 | Niu et al. | |
| 7,185,256 B2 | 2/2007 | Miki et al. | |
| 7,676,724 B2 * | 3/2010 | Lundby | 714/750 |
| 2002/0069388 A1 | 6/2002 | Niu et al. | |
| 2006/0268887 A1 | 11/2006 | Lu et al. | |

FOREIGN PATENT DOCUMENTS

CN 1327354 12/2001

(Continued)

OTHER PUBLICATIONS

International Search Report PCT/US03/021276, International Search Authority European Patent Office Oct. 15, 2003.

(Continued)

*Primary Examiner* — Guy Lamarre
(74) *Attorney, Agent, or Firm* — Howard H. Seo

(57) ABSTRACT

Methods and apparatus are presented for dynamically controlling the re-transmission scheme of acknowledgment signals. A source transmits a first data packet over a slot $s_1$. If channel conditions are favorable, source transmits a second data packet over slot $s_2$, which precedes the reception of any acknowledgment signals. A destination receives first data packet over slot $d_1$ and second data packet over slot $d_2$. Destination decodes first data packet during slots $d_2$ and $d_3$, and second data packet over slots $d_3$ and $d_4$. Destination transmits an acknowledgment signal (ACK1) associated with first data packet during slot $d_4$. Rather then transmitting the second ACK1 associated with first data packet over slot $d_5$, destination preempts this slot with an acknowledgment signal ACK2, which is associated with second data packet transmitted by source. Hence, destination is configured to overwrite the repetition of a previous acknowledgment in order to transmit a new acknowledgment.

20 Claims, 4 Drawing Sheets

FOREIGN PATENT DOCUMENTS

| | | |
|---|---|---|
| EP | 0535860 | 4/1993 |
| EP | 0964534 | 12/1999 |
| KR | 1020010080057 | 8/2001 |
| KR | 1020020000514 | 1/2002 |
| WO | 0013364 | 3/2000 |
| WO | 0033503 | 6/2000 |
| WO | 0052873 | 9/2000 |

OTHER PUBLICATIONS

International Preliminary Examination Report PCT/US03/021276, IPEA/US Mar. 14, 2004.

\* cited by examiner

FEEDBACK FOR DATA TRANSMISSIONS

The present application for patent is a continuation and claims priority to patent application Ser. No. 11/562,332, filed Nov. 21, 2006, which issued as U.S. Pat. No. 7,676,724 on Mar. 9, 2010 and entitled as IMPROVED FEEDBACK FOR DATA TRANSMISSIONS; and patent application Ser. No. 10/191,730, filed Jul. 8, 2002, which issued as U.S. Pat. No. 7,159,163 on Jan. 2, 2007 and entitled FEEDBACK FOR DATA TRANSMISSIONS, each being assigned to the assignee hereof and hereby expressly incorporated by reference herein.

Embodiments of the invention relate generally to packet data communications, and more specifically, to improving feedback systems that use acknowledgement signals.

BACKGROUND

Field

The field of wireless communications has many applications including, e.g., cordless telephones, paging, wireless local loops, personal digital assistants (PDAs), Internet telephony, and satellite communication systems. A particularly important application is cellular telephone systems for mobile subscribers. As used herein, the term "cellular" system encompasses both cellular and personal communications services (PCS) frequencies. Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). IS-95 and its derivatives, IS-95A, IS-95B, ANSI J-STD-008 (often referred to collectively herein as IS-95), and proposed high-data-rate systems are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and incorporated by reference herein. An exemplary system utilizing CDMA techniques is the cdma2000 ITU-R Radio Transmission Technology (RTT) Candidate Submission (referred to herein as cdma2000), issued by the TIA. The standard for cdma2000 is given in the draft versions of IS-2000 and has been approved by the TIA. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

The telecommunication standards cited above are examples of only some of the various communications systems that can be implemented. Some of these various communications systems are configured to allow the transmission of data traffic between subscriber units and base stations. In systems that are designed to carry data traffic, optimization of the data throughput of the system is always an ultimate goal. Moreover, It is desirable to ensure reliable reception of the transmitted information. The embodiments described herein are for a reliable feedback mechanism that will improve the reliable reception of transmitted data, which will further improve the data throughput of a communication system.

SUMMARY

The methods and apparatus presented herein address the needs stated above. In one aspect, an apparatus is presented for dynamically controlling acknowledgment re-transmissions from a destination, the apparatus comprising: at least one a memory element; and at least one processing element configured to execute a set of instructions stored within the at least one memory element, the set of instructions for: determining a quality measure of at least one received acknowledgment signal; and using the quality measure to determine a packet transmission pace, wherein the packet transmission pace is for forcing the destination to overwrite a re-transmission of an old acknowledgment signal with a new acknowledgment signal.

In another aspect, a method is presented for dynamically controlling acknowledgment re-transmissions from a destination, comprising: determining a quality measure of at least one received acknowledgment signal; and using the quality measure to determine a packet transmission pace, wherein the packet transmission pace is for forcing the destination to overwrite a re-transmission of an old acknowledgment signal with a new acknowledgment signal.

In another aspect, a method is presented for dynamically controlling an acknowledgment signal re-transmission scheme of a destination, the method comprising: determining a channel condition of a feedback link from the destination; and setting a packet transmission pace in accordance with the determined channel condition, wherein setting the packet transmission pace is for overwriting an already decided re-transmission scheme of the destination.

In another aspect, a method is presented for reducing a feedback delay of a packet data communication system, comprising: transmitting a first data packet from a source to a destination over a first slot; transmitting a second data packet from the source to the destination over a second slot, the second slot following the first slot and preceding a received acknowledgement signal; receiving the first data packet at the destination and decoding the first data packet; scheduling an acknowledgment signal for the first data packet over a first transmission slot and a re-transmission of the first data packet acknowledgment signal over a second slot; receiving the second data packet at the destination and decoding the second data packet; scheduling an acknowledgment signal for the second data packet over the second slot, wherein the acknowledgment signal for the second data packet overwrites the scheduled re-transmission of the first data packet acknowledgment signal; and transmitting the acknowledgment for the first data packet over the first transmission slot and transmitting the acknowledgment for the second data packet over the second transmission slot.

DETAILED DESCRIPTION

Figure 1:
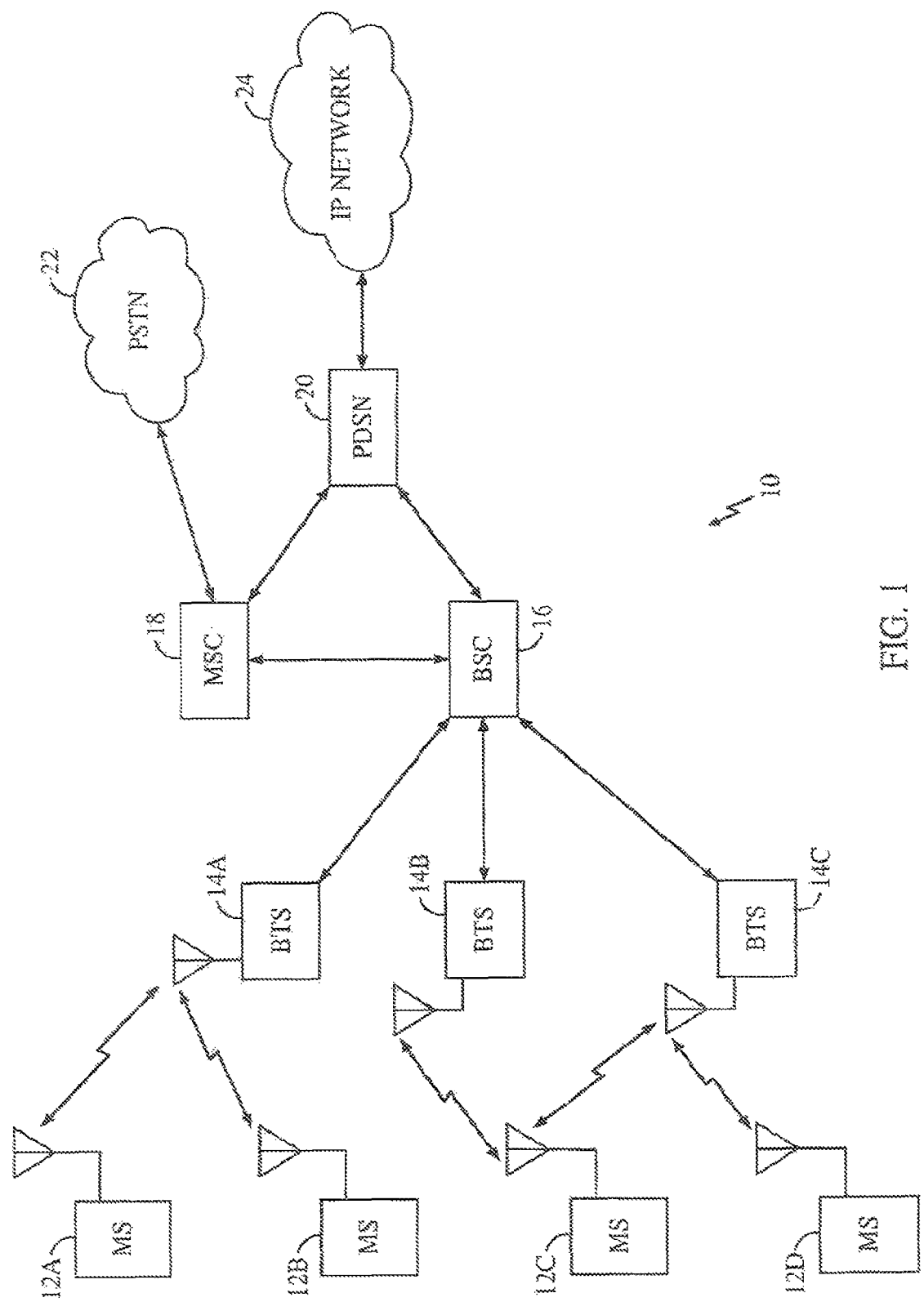
FIG. 1 is a diagram of a wireless communication network.

As illustrated in FIG. 1, a wireless communication network 10 generally includes a plurality of mobile stations (also called subscriber units or user equipment or remote stations) 12a-12d, a plurality of base stations (also called base station transceivers (BTSs) or Node B). 14a-14c, a base station controller (BSC) (also called radio network controller or packet control function 16), a mobile switching center (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four mobile stations 12a-12d, three base stations 14a-14c, one BSC 16, one MSC 18, and one PDSN 20 are shown. It would be understood by those skilled in the art that there could be any number of mobile stations 12, base stations 14, BSCs 16, MSCs 18, and PDSNs 20.

In one embodiment the wireless communication network 10 is a packet data services network. The mobile stations 12a-12d may be any of a number of different types of wireless communication device such as a portable phone, a cellular telephone that is connected to a laptop computer running IP-based, Web-browser applications, a cellular telephone with associated hands-free car kits, a personal data assistant (PDA) running IP-based, Web-browser applications, a wireless communication module incorporated into a portable computer, or a fixed location communication module such as might be found in a wireless local loop or meter reading system. In the most general embodiment, mobile stations may be any type of communication unit.

The mobile stations 12a-12d may advantageously be configured to perform one or more wireless packet data protocols such as described in, for example, the EIA/TIA/IS-707 standard. In a particular embodiment, the mobile stations 12a-12d generate IP packets destined for the IP network 24 and encapsulate the IP packets into frames using a point-to-point protocol (PPP).

In one embodiment the IP network 24 is coupled to the PDSN 20, the PDSN 20 is coupled to the MSC 18, the MSC is coupled to the BSC 16 and the PSTN 22, and the BSC 16 is coupled to the base stations 14a-14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20.

During typical operation of the wireless communication network 10, the base stations 14a-14c receive and demodulate sets of reverse signals from various mobile stations 12a-12d engaged in telephone calls, Web browsing, or other data communications. Each reverse signal received by a given base station 14a-14c is processed within that base station 14a-14c. Each base station 14a-14c may communicate with a plurality of mobile stations 12a-12d by modulating and transmitting sets of forward signals to the mobile stations 12a-12d. For example, as shown in FIG. 1, the base station 14a communicates with first and second mobile stations 12a, 12b simultaneously, and the base station 14c communicates with third and fourth mobile stations 12c, 12d simultaneously. The resulting packets are forwarded to the BSC 16, which provides call resource allocation and mobility management functionality including the orchestration of soft handoffs of a call for a particular mobile station 12a-12d from one base station 14a-14c to another base station 14a-14c. For example, a mobile station 12c is communicating with two base stations 14b, 14c simultaneously. Eventually, when the mobile station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

In some communication systems, packets carrying data traffic are divided into subpackets, which occupy slots of a transmission channel. For illustrative ease only, the nomenclature of a cdma2000 system is used herein. Such use is not intended to limit the implementation of the embodiments herein to cdma2000 systems. Embodiments can be implemented in other systems, such as, e.g., WCDMA, without affecting the scope of the embodiments described herein.

The forward link from the base station to a remote station operating within the range of the base station can comprise a plurality of channels. Some of the channels of the forward link can include, but are not limited to, a pilot channel, synchronization channel, paging channel, quick paging channel, broadcast channel, power control channel, assignment channel, control channel, dedicated control channel, medium access control (MAC) channel, fundamental channel, supplemental channel, supplemental code channel, packet data channel, and acknowledgement channel.

The reverse link from a remote station to a base station also comprises a plurality of channels. Some of the channels of the reverse link can include, but are not limited to, a pilot channel, fundamental channel, dedicated control channel, supplemental channel, packet data channel, access channel, channel quality feedback channel, and acknowledgement channel.

Each channel carries different types of information to the target destination. Typically, voice traffic is carried on fundamental channels, and data traffic is carried on supplemental channels or packet data channels. Supplemental channels are typically enabled for durations of time in the order of seconds and seldom change modulation and coding formats, whereas packet data channels are dynamically changed from one 20 ms interval to another. For the purposes of describing the embodiments herein, the supplemental channels and the packet data channels are generically referred to as data traffic channels.

Voice traffic and data traffic are typically encoded, modulated, and spread before transmission on either the forward or reverse links. The encoding, modulation, and spreading can be implemented in a variety of formats. In a CDMA system, the transmission format ultimately depends upon the type of channel over which the voice traffic and data traffic are being transmitted and the condition of the channel, which can be described in terms of fading and interference.

Predetermined transmit formats, which correspond to a combination of various transmit parameters, can be used to simplify the choice of transmission formats. In one embodiment, the transmission format corresponds to a combination of any or all of the following transmission parameters: the modulation scheme used by the system, the number of orthogonal or quasi-orthogonal codes, the data payload size in bits, the duration of the message frame, and/or details regarding the encoding scheme. Some examples of modulation schemes used within communication systems are the Quadrature Phase Shift Keying scheme (QPSK), 8-ary Phase Shift Keying scheme (8-PSK), and 16-ary Quadrature Amplitude Modulation (16-QAM). Some of the various encoding schemes that can be selectively implemented are convolutional encoding schemes, which are implemented at various rates, or turbo coding, which comprises multiple encoding steps separated by interleaving steps.

Orthogonal and quasi-orthogonal codes, such as the Walsh code sequences, are used to channelize the information sent to each remote station on the forward link. In other words, Walsh code sequences are used on the forward link to allow the system to overlay multiple users, each assigned a different orthogonal or quasi-orthogonal code, on the same frequency during the same time duration. Orthogonal codes, such as the Walsh code sequences, are used to channelize separate, different streams of information on the reverse link, such as dedicated control channel, supplemental channel, fundamental channel, and acknowledgement channel.

For the embodiments that are described below, the term "source" is used to indicate the party that is transmitting data for which acknowledgment is sought, and the term "destination" is used to indicate the party that is transmitting the acknowledgment. The source may be either a base station transmitting on the forward link or a mobile station transmitting on the reverse link. The destination may be a mobile station receiving on the forward link or a base station receiving on the reverse link. In other words, the embodiments can be extended for implementation on either the forward or the reverse links.

Moreover, for illustrative ease, the terms "data information" is used herein to describe the information that is to be transmitted between source and information. The term "data packet" is used to describe data information that has been encoded and modulated according to a transmission format.

The transmit format and power on a data traffic channel are typically adjusted by a source so as to ensure a high likelihood of successful reception at a destination. Successful decoding may be verified by a combination of one or several methods well known in the art, such as determining whether the cyclic redundancy check (CRC) bits of the data packet pass or fail, computing the re-encoded error rate, or computing the Yamamoto metric for Viterbi decoders.

Due to unpredictable variations in the channel quality and the interference levels at the destination's receiver, the source cannot directly determine whether the destination has successfully received a transmission or not. In typical packet, data systems, an acknowledgement signal indicating the success or failure of the data transmission is transmitted back from the destination to the source. In some packet data systems, the acknowledgement signal is transmitted on an acknowledgement channel soon after the reception of a data packet by the destination. Moreover, in some packet data systems, the acknowledgment signal is time-division multiplexed with additional information, which is then transmitted on a designated channel.

If the source receives a negative acknowledgment signal, the source may decide to re-transmit the data packet. In order to ensure the eventual, successful reception of the data, the source may decide to re-transmit the data packet with a different coding format or transmission format. Alternatively, the source may decide after several unsuccessful transmission attempts to discontinue transmission of the data packet for various reasons, one reason being that the data information within the data packet becomes obsolete and useless after a certain period.

If the data packet is re-transmitted by the source, and subsequently received by the destination, the destination may combine portions of the newly received data packet with a stored copy of the previous data packet in order to further increase the likelihood of successful decoding. It should be noted that although a previously transmitted data packet may not have been successfully decoded, the destination may still store this previous, unsuccessfully decoded data packet and use information about this unsuccessfully decoded data packet to decode the newly received data packet.

While waiting for an acknowledgement signal to be received for a transmitted data packet, the source may transmit a packet of new data information to another destination, which will also need to be stored until the acknowledgment of this new data packet is received. This process may be continued with several more packets to several more destinations before the acknowledgment for the first packet from the first destination is received, thereby requiring the source to have an undesirably large memory in order to store all the packets waiting for acknowledgements. Alternatively, the source may have a limited amount of memory and may stop transmitting new packets when this memory is full. If the source stops transmitting new packets, then a dead time will occur, which reduces the overall throughput of the source.

Similarly, the destination needs to store packets that are awaiting re-transmission. As discussed earlier, the destination may use portions of previously received data packets to decode the subsequently received data packets. The destination may therefore either have a large memory so as to store all packets awaiting re-transmission from the source, or sacrifice its throughput by not being able to continuously receive packets. Both of these choices are undesirable.

One solution to the above-described problem is to use an acknowledgement signal that takes the shortest amount of time possible to be received by the source. If the acknowledgment signals are more quickly received by the source, then a reduction occurs in the feedback time between packet transmission and acknowledgment reception. A reduction in feedback time proportionately reduces the amount of packets awaiting transmission, which reduces memory requirements and data dead time. Hence, in order to minimize the amount of memory required to store the packet for later use in re-transmission, present high data rate transmission systems are configured to transmit rapid acknowledgements so that the source can quickly transmit the next data packet.

However, the transmission of rapid acknowledgments can also be problematic. A positive acknowledgement misinterpreted as a negative acknowledgement by the source will cause the packet to be unnecessarily re-transmitted, thereby reducing the useful throughput of the system. A negative acknowledgement that is misinterpreted as a positive acknowledgement will cause a packet to be lost and never re-transmitted. Hence, it is desirable for the acknowledgement to be accurately received by the source. To address this problem, various upper-layer protocols, such as the Radio Link Protocol (RLP) and the Transmission Control Protocol (TCP), have been designed to ensure the reliable delivery of data between parties. However, since these are upper-layer protocols, a large processing overhead is necessary to re-transmit any lost data segments, which results in significant delays in the delivery of the data segment to the final destination. If no such upper layer protocol is present in the system, the loss of this data segment will directly impact the destination.

Figure 2:
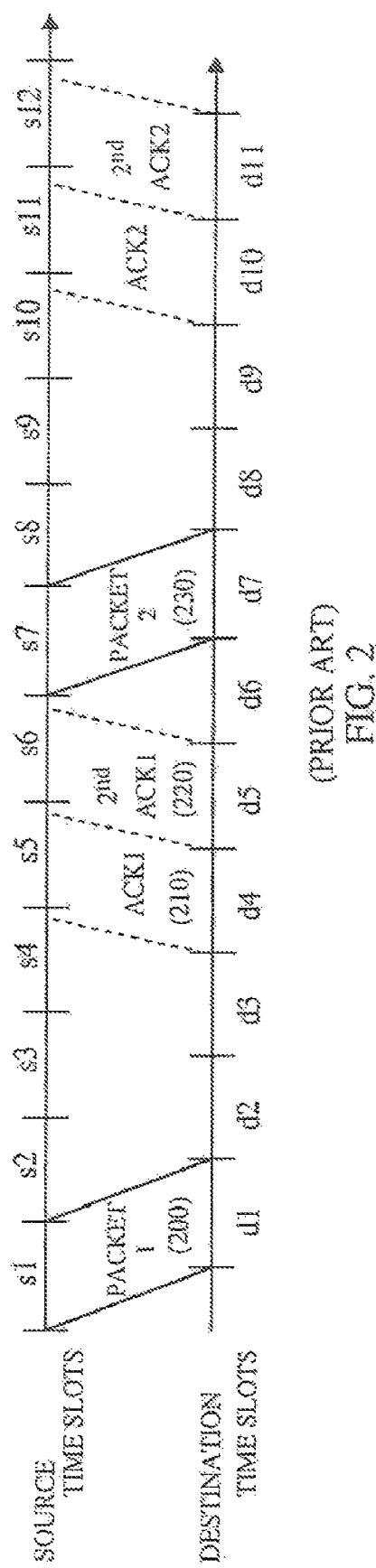
FIG. 2 shows slotted timelines for performing a prior art, rapid acknowledgment method.

FIG. 2 comprises two timelines that illustrate a rapid acknowledgment method that does not use upper layer protocols. A source transmits a first packet 200 in slot $s_1$ to a destination, which receives the first packet 200 in slot $d_1$. At the destination, at least two slot periods $d_2$ and $d_3$ are needed for the destination's receiver to decode the first packet 200. The destination transmits a first acknowledgment 210 in slot period $d_4$ to the source. The destination then transmits a second acknowledgment 220 in slot period $d_5$ to the source to confirm the first acknowledgment 210. At slot period $s_7$, the source determines that the information carried by the first packet 200 was not successfully decoded and re-transmits the information in a second packet 230. Alternatively, the source determines that the information carried by the first packet 200 was successfully decoded and transmits new information in the second packet 230. In either instance, there are at least 5 slot periods ($s_2$, $s_3$, $s_4$, $s_5$, and $s_6$) in which the source does not transmit to the destination. It should be noted that the slot periods $s_i$ and $d_i$ are set to be of equal duration.

Besides the method above of repeating acknowledgment signals, another method to increase the likelihood that an acknowledgment signal is accurately received by the source is to increase the transmit power of the acknowledgment signal. Typically, transmit power is limited due to transmitter design limitations, such as high powered amplifiers that are built to comply with limits set by local, national, or international regulatory bodies. Furthermore, a large transmit power may cause a large burst of interference to users in the same coverage area or different coverage areas, thereby degrading the capacity of the system or even creating occasional losses of communication. Hence, increasing the transmit power is not a desirable solution.

Another method to increase the likelihood that an acknowledgment signal is accurately received by the source is to increase the transmission duration of the acknowledgment signal. However, as stated above, one of ordinary skill in the art would discard this method as being contrary to the goal of rapid acknowledgements, which allows the source to quickly transmit the next packet and minimize the storage space needed for the re-transmissions.

The embodiments described herein are directed to improving the accurate reception of acknowledgment signals, minimizing the storage space needed for re-transmissions, and improving the data throughput of the communication system. The embodiments achieve these goals by the use of dynamic decoding of extended length acknowledgement signals.

In one embodiment, the acknowledgement signal is a signal transmitted using a simple modulation, such as an uncoded binary phase-shift keying (BPSK) signal, that is channelized by an orthogonal Walsh code sequence. The probability of successful decoding this acknowledgement signal can be related to the energy per bit to noise ($E_b/N$) ratio received. The $E_b/N$ ratio is a function of parameters that cannot be directly controlled by the system, such as the channel path loss, fast fading, shadowing, and the interference level upon reception. A high $E_b/N$ ratio indicates that the acknowledgement signal is likely to be correctly decoded, whereas a low $E_b/N$ ratio indicates that the acknowledgment signal is less likely to be correctly decoded. Hence, it is therefore desirable to maintain the highest $E_b/N$ ratio possible for the acknowledgement signal. The $E_b/N$ ratio can be varied by either increasing the transmit power of the acknowledgement signal, or by increasing the transmission duration of the acknowledgement signal.

Although increasing the duration of the acknowledgement signal impacts the latency of receiving the acknowledgement signal, the present embodiments are for configuring a source so that the source can use the $E_b/N$ ratio to dynamically decode the extended acknowledgment signal. Once the source has enough information from the $E_b/N$ ratio to confidently decode the extended length acknowledgment signal, the source decodes that portion of the extended length acknowledgment signal corresponding to the $E_b/N$ ratio and stops decoding the rest of the extended length acknowledgment signal.

In one embodiment, the duration of the acknowledgment signal is fixed to a long duration, for example 4 slots. The source's receiver processes the acknowledgement signal along with the corresponding $E_b/N$ ratio. As soon as the $E_b/N$ ratio attains a value such as to ensure a sufficient likelihood of reception, the source stops decoding the remaining portion of the acknowledgment signal.

In one aspect of the embodiment, determination of the $E_b/N$ ratio is made by comparing the signal to noise ratio of the pilot channel accumulated from the transmission start of the acknowledgement signal to a threshold T. As soon as the accumulated signal to noise ratio is greater or equal to T, the acknowledgement signal received up to then is assumed to be sufficiently reliable. Whenever the received signal quality is sufficient, the source will decode the acknowledgement signal before the entire acknowledgment signal is received. Hence, the feedback delay associated with decoding the entire extended acknowledgment signal is reduced.

Figure 3:
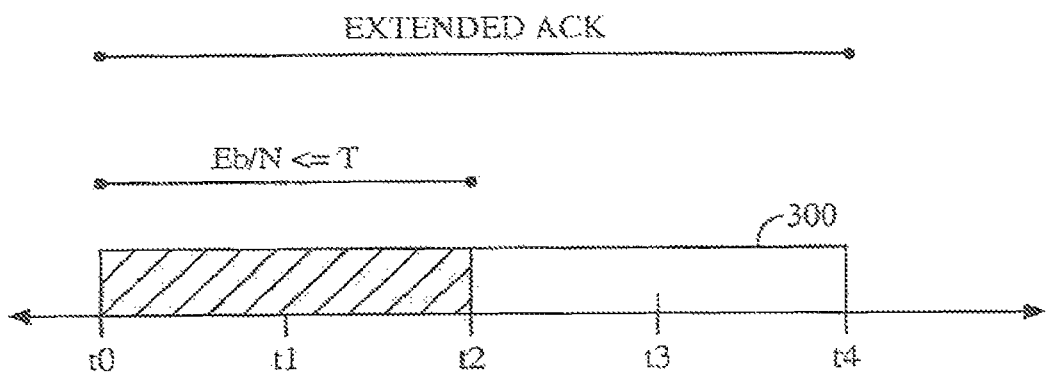
FIG. 3 is a timeline for decoding an acknowledgment signal.

FIG. 3 illustrates the decoding of the extended length acknowledgment signal as described above. Hardware within the source, such as memory elements and processing elements, can be configured to perform the methods that follow. At time $t_0$, the start of the extended length acknowledgment signal 300 is received by a source (not shown). The source starts accumulating the $E_b/N$ ratio from time $t_0$. At time $t_2$, the source determines that the accumulated $E_b/N$ ratio equals threshold T. The source then refrains from decoding the remaining portion of the extended acknowledgment signal from time $t_2$ onwards. The source uses the information contained in that portion of the extended length acknowledgment signal received between $t_o$ and $t_2$ to determine whether the data packet was successfully received at the destination (not shown).

Figure 4:
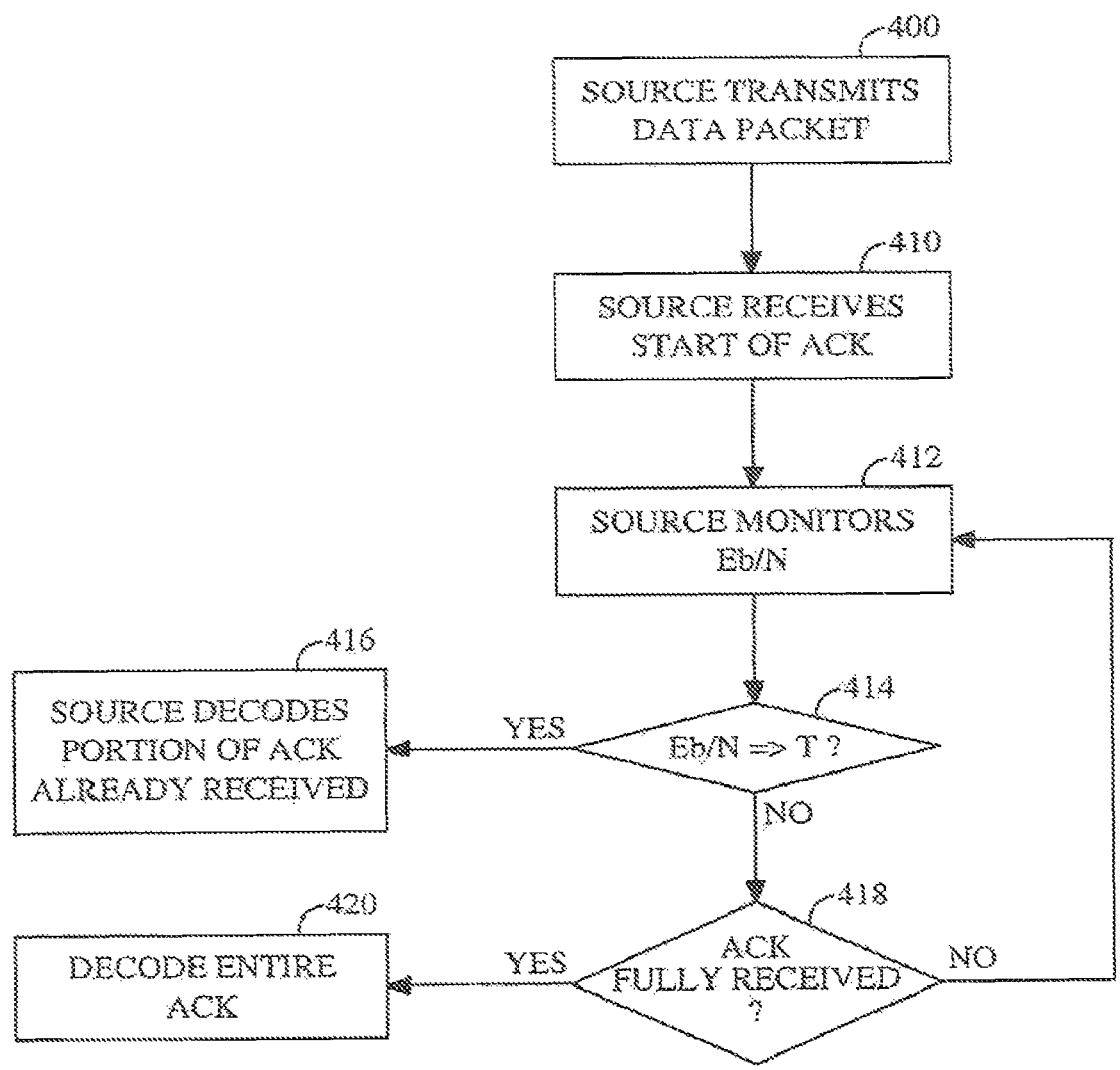
FIG. 4 is a flowchart for rapidly decoding an acknowledgment signal.

FIG. 4 is a flowchart further illustrating the method steps described above. At step 400, the source transmits a data packet. At step 410, the source starts receiving an acknowledgment signal. At step 412, the source monitors an $E_b/N$ ratio while receiving the acknowledgment signal. At step 414, the source compares an accumulated value of the $E_b/N$ ratio to a threshold T. If the accumulated value of the $E_b/N$ ratio is equal to or greater than the threshold T, the program flow proceeds to step 416, wherein the source decodes the portion of the acknowledgment signal that has been received up to the accumulated $E_b/N$ ratio of T, and disregards the remaining portion of the acknowledgment signal.

If the accumulated value of the $E_b/N$ ratio is less than the threshold T, then the program flow proceeds to step 418, wherein a determination as to whether the extended length acknowledgment signal has been fully received. If the extended length acknowledgment signal is fully received, then at step 420, the source decodes the entire extended length acknowledgment signal. If the extended length acknowledgment signal is not fully received, then the program flow proceeds back to step 412.

Hence, in the above-described embodiment, the source can transmit the next data packet when the source is confident, which can occur before the end of the acknowledgment signal.

Additional Feedback Improvements

The above-described embodiment can be implemented independently or can be implemented in conjunction with other feedback improvements. In other feedback improvements, the processing elements in the source that control the scheduling and transmission formats of the data packets and the processing elements in the destination that control the scheduling and transmission formats of the acknowledgment signals can be re-configured to minimize the feedback delay between data packet transmissions.

Referring again to FIG. 2, the prior art feedback system operates with a delay of at least 5 slot periods between a first data packet transmission and a second data packet transmission, wherein the delay is due to the wait for acknowledgment signals. In one embodiment, the processing elements are configured to eliminate this feedback delay altogether if the source has determined that favorable feedback channel conditions exist between the source and the destination. The elimination of the feedback delay can be accomplished by the source "overwriting" an acknowledgment signal repetition parameter that is usually controlled at the destination. In the present art, processing elements in the destination control the scheduling of the acknowledgment signals, which also entails the control of the re-transmissions of the acknowledgment signals. The re-transmissions are repetitions of the first acknowledgment signal formulated with appropriate transmission formats. As discussed earlier, the repetitions are to ensure the accurate decoding of the acknowledgment signals at the source. The embodiments described herein are directed towards enabling a source with the dynamic control of the repetition parameters of acknowledgment signals.

Figure 5:
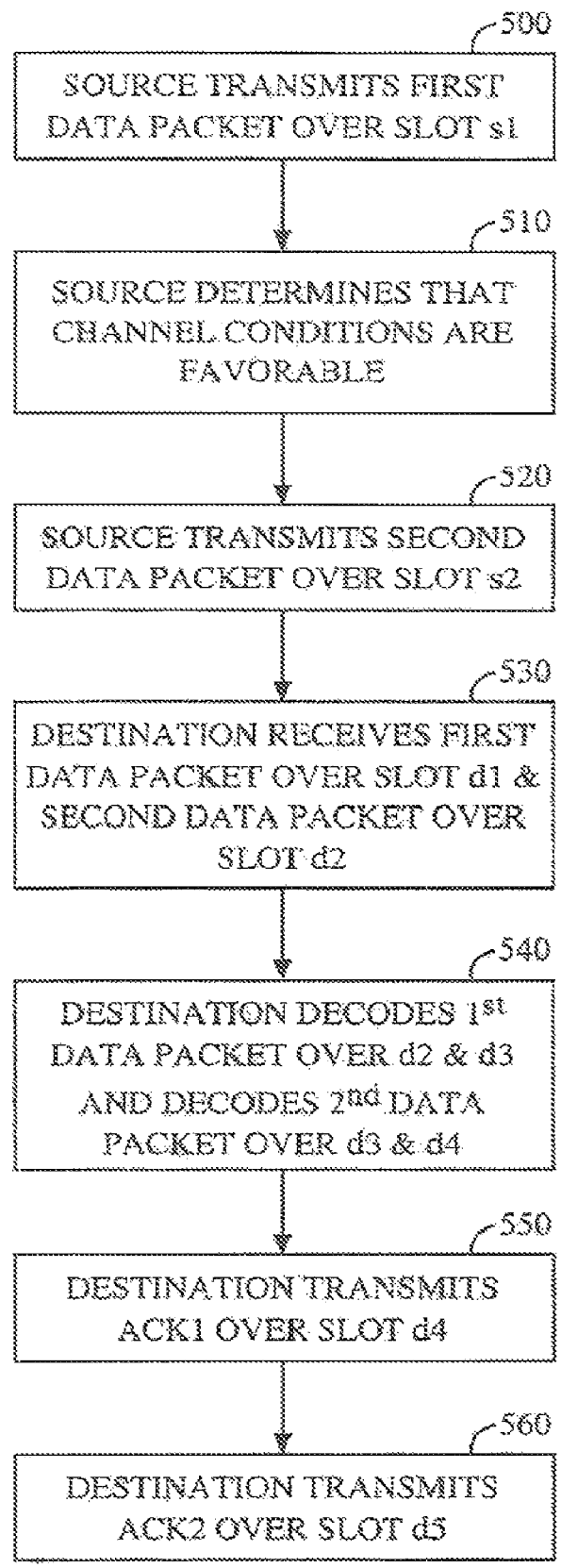
FIG. 5 is a flowchart for performing a new rapid acknowledgment method.

FIG. 5 is a flowchart of a fast data packet transmission scheme in accordance with one embodiment. Hardware within the source and destination, such as memory elements and processing elements, can be configured to perform the method steps that follow. At step 500, the source transmits a first data packet over a slot $s_1$. At step 510, the source determines that the channel conditions are favorable, i.e., transmissions are very likely to be received and decoded successfully. Numerous methods are available for allowing a source to determine whether channel conditions are favorable, but the choice of which method to use is not relevant to understanding the instant embodiment, and so, such methods will not described in detail herein. Favorable channel conditions could be said to exist if the channel is sufficiently reliable or of sufficient quality such as to allow the source to decode the acknowledgment signal without using repetition(s).

At step 520, the source transmits a second data packet over slot $s_2$, which follows slot $s_1$ and precedes the reception of any acknowledgment signals. Since the channel conditions are determined to be favorable, the source may assign a data payload to the second data packet that is different from the data payload of the first data packet.

At step 530, the destination receives the first data packet over slot $d_1$ and the second data packet over slot $d_2$. At step 540, the destination decodes the first data packet during slots $d_2$ and $d_3$, and decodes the second data packet over slots $d_3$ and $d_4$.

At step 550, the destination transmits an acknowledgment signal (ACK1) associated with the first data packet during slot $d_4$. At step 560, rather then transmitting the second ACK1 associated with the first data packet over slot $d_5$, the destination preempts this slot with an acknowledgment signal ACK2, which is associated with the second data packet transmitted by the source. Hence, the processing elements in the destination are configured to overwrite the repetition of a previous acknowledgment in order to transmit a new acknowledgment. It should be noted that in prior art systems, a source is configured to avoid scheduling transmissions if the data packet transmissions would result in overlapping acknowledgment signals, i.e., if an acknowledgment signal for a new data packet overlapped one of the acknowledgment signals for an old data packet.

Hence, this embodiment is directed towards a source that manipulates the re-transmission decisions of the destination by forcing overwrites over the re-transmissions. By using this embodiment, the overall feedback delay is reduced by a substantial factor. This savings is illustrated in FIG. 6, which shows slotted timelines illustrating the above embodiment.

If the repetitions of the acknowledgment signals can be overwritten such as described in the embodiment above, then a source can exploit the knowledge of favorable channel conditions to dynamically decide the number of acknowledgment repetitions that a destination will send. The source may directly alter the number of acknowledgment repetitions by controlling the pace at which data packets are transmitted to the destination.

Figure 6:
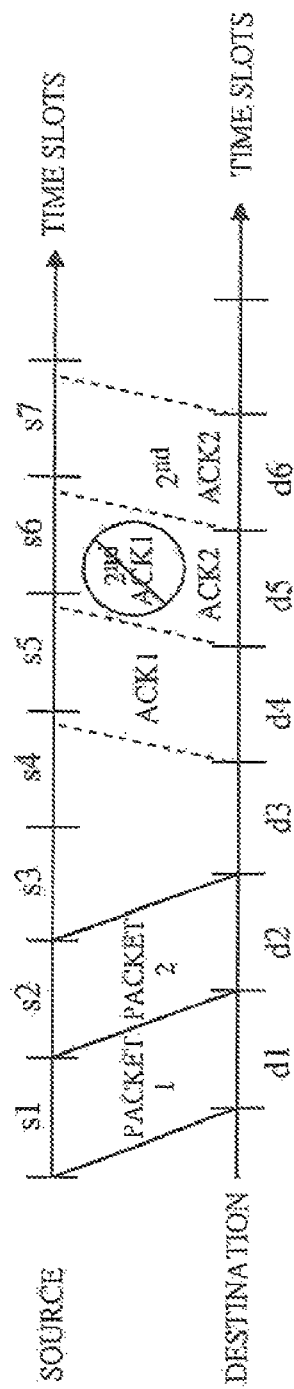
FIG. 6 shows slotted timelines for performing the new rapid acknowledgment method.

For example, if the source determines that no repetitions are needed, then the source would transmit data packets as illustrated in FIG. 6. However, if the source determined that one repetition was needed for accurately decoding the acknowledgment signal, then the source would transmit a first packet over slot $s_1$, pause over slot $s_2$, and then transmit a second packet over slot $s_3$. The destination would receive the first data packet over slot $d_1$, decode the first data packet over slots $d_2$ and $d_3$, transmit the first acknowledgment of the second data packet over slot $d_4$, and transmit the repetition of the first acknowledgment over slot $d_5$. Concurrently, the destination would receive the second data packet over slot $d_3$, decode the second data packet over slots $d_4$ and $d_5$, and transmit the first acknowledgment of the second data packet over slot $d_6$.

In the above example, no overwrite would occur due to the source's timing of transmissions. However, in another example, if the destination had decided to have two repetitions of the first data packet acknowledgment signal over slots $d_5$ and $d_6$, but the source had decided that only one repetition of the first data packet acknowledgment signal was needed, the source could have forced one overwrite over slot $d_6$ by timing the second data packet transmission to occur over slot $s_3$.

In one aspect of this embodiment, the source may set a transmission pace that is based upon previous quality measures of the feedback link. For example, the source can determine whether the feedback link quality appears stable over a time period, the source can determine whether the acknowledgment signal is consistently decoded without repetition (or with repetition), the source can use an accumulated energy value, or the source can use some other method for determining the quality of the feedback link. Depending upon the feedback link channel conditions, the source can dynamically change the number of repetitions transmitted by the destination, rather than waiting for a fixed number of repetitions set by system parameters.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for reducing a feedback delay over a forward link at a mobile station, comprising:
   receiving and decoding a first data packet wherein the first data packet is transmitted from a base station;
   scheduling an acknowledgment signal for the first data packet over a first transmission slot and a re-transmission of the first data packet acknowledgment signal over a second slot;
   receiving and decoding a second data packet wherein the second data packet is transmitted from the base station;
   scheduling an acknowledgement signal for the second data packet over the second slot, wherein the acknowledgment signal for the second data packet overwrites the scheduled re-transmission of the first data packet acknowledgment signal; and
   transmitting the acknowledgment for the first data packet over the first transmission slot and transmitting the acknowledgment for the second data packet over the second transmission slot.

2. The method according to claim 1, wherein the base station determines a quality measure of at least one received acknowledgment signal, and the base station further determines a packet transmission pace based upon the quality measure, wherein the packet transmission pace forces the mobile station to schedule the overwriting of the acknowledgment signal of the first data packet.

3. The method according to claim 2, wherein the quality measure includes an accumulated energy per bit noise ratio of the at least one received acknowledgement signal at the base station.

4. The method according to claim 3, wherein the accumulated energy per bit noise ratio is based upon an accumulated signal to noise ratio of the pilot channel.

5. The method according to claim 2, wherein the quality measure is based on a number of successfully decoded acknowledgement signals at the base station within a time period.

6. A mobile station which reduces a feedback delay over a forward link for packet data communications, comprising:
   means for receiving and decoding a first data packet, wherein the first packet is transmitted from a base station;
   means for scheduling an acknowledgment signal for the first data packet over a first transmission slot and a re-transmission of the first data packet acknowledgment signal over a second slot;
   means for receiving and decoding a second data packet, wherein the second packet is transmitted from the base station;
   means for scheduling an acknowledgement signal for the second data packet over the second slot, wherein the acknowledgment signal for the second data packet overwrites the scheduled re-transmission of the first data packet acknowledgment signal; and
   means for transmitting the acknowledgment for the first data packet over the first transmission slot and transmitting the acknowledgment for the second data packet over the second transmission slot.

7. The mobile station according to claim 6, wherein the base station determines a quality measure of at least one acknowledgment signal, and the base station further determines a packet transmission pace based upon the quality measure, wherein the packet transmission pace forces the mobile station to schedule the overwriting of acknowledgment signal of the first data packet.

8. The mobile station according to claim 7, wherein the quality measure includes an accumulated energy per bit noise ratio of the at least one received acknowledgement signal at the base station.

9. The mobile station according to claim 8, wherein the accumulated energy per bit noise ratio is based upon an accumulated signal to noise ratio of the pilot channel.

10. The mobile station according to claim 7, wherein the quality measure is based on a number of successfully decoded acknowledgement signals at the base station within a time period.

11. A mobile station which reduces feedback delay over a forward link for packet data communications, comprising;
   a memory element; and
   a processing element which executes a set of instructions stored within the memory element, wherein the set of instructions cause the mobile station to receive and decode a first data packet, wherein the first data packet is transmitted from a base station, schedule an acknowledgment signal for the first received data packet over a first transmission slot and are transmission of the first data packet acknowledgment signal over a second slot, receive and decode a second data packet, wherein the second data packet is transmitted from the base station, schedule an acknowledgement signal for the second data packet over the second slot, wherein the acknowledgment signal for the second data packet overwrites the scheduled re-transmission of the first data packet acknowledgment signal, and transmit the acknowledgment for the first data packet over the first transmission slot and transmitting the acknowledgment for the second data packet over the second transmission slot.

12. The mobile station according to claim 11, wherein the base station determines a quality measure of at least one acknowledgment signal, and the base station further determines a packet transmission pace based upon the quality measure, wherein the packet transmission pace forces the mobile station to schedule the overwriting of acknowledgment signal of the first data packet.

13. The mobile station according to claim 12, wherein the quality measure includes an accumulated energy per bit noise ratio of the at least one received acknowledgement signal.

14. The mobile station according to claim 13, wherein the accumulated energy per bit noise ratio based upon an accumulated signal to noise ratio of the pilot channel.

15. The mobile station according to claim 12, wherein the quality measure is based on a number of successfully decoded acknowledgement signals at the base station within a time period.

16. A computer readable media embodying instructions for reducing a feedback delay over a forward link at a mobile station, the instructions configured to perform a method which comprises:

receiving and decoding a first data packet, wherein the first data packet is transmitted from a base station;

scheduling an acknowledgment signal for the first data packet over a first transmission slot and a re-transmission of the first data packet acknowledgment signal over a second slot;

receiving and decoding as second data packet, wherein the second data packet is transmitted from the base station;

scheduling an acknowledgement signal for the second data packet over the second slot, wherein the acknowledgment signal for the second data packet overwrites the scheduled re-transmission of the first data packet acknowledgment signal; and transmitting the acknowledgment for the first data packet over the first transmission slot and transmitting the acknowledgment for the second data packet over the second transmission slot.

17. The computer readable media according to claim 16, wherein the base station determines a quality measure of at least one received acknowledgment signal, and the base station further determines a packet transmission pace based upon the quality measure, wherein the packet transmission pace forces the mobile station to schedule the overwriting of the acknowledgment signal of the first data packet.

18. The computer readable media according to claim 17, wherein the quality measure includes an accumulated energy per bit noise ratio of the at least one received acknowledgement signal at the base station.

19. The computer readable media according to claim 18, wherein the accumulated energy per bit noise ratio is based upon an accumulated signal to noise ratio of the pilot channel.

20. The computer readable media according to claim 17, wherein the quality measure is based on a number of successfully decoded acknowledgement signals at the base station within a time period.

* * * * *